(12) United States Patent
Ochiai et al.

(10) Patent No.: US 9,701,056 B2
(45) Date of Patent: Jul. 11, 2017

(54) FABRICATION METHOD FOR LAMINATED-TYPE SECONDARY BATTERY

(71) Applicant: NISSAN MOTOR CO., LTD., Yokohama-shi, Kanagawa (JP)

(72) Inventors: Kenichi Ochiai, Atsugi (JP); Shinichiro Kitagawa, Atsugi (JP); Masakazu Shibuya, Fuji (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 475 days.

(21) Appl. No.: 14/350,212

(22) PCT Filed: Oct. 10, 2012

(86) PCT No.: PCT/JP2012/076233
§ 371 (c)(1),
(2) Date: Jul. 9, 2014

(87) PCT Pub. No.: WO2013/054816
PCT Pub. Date: Apr. 18, 2013

(65) Prior Publication Data
US 2014/0363730 A1    Dec. 11, 2014

(30) Foreign Application Priority Data

Oct. 11, 2011  (JP) ................. 2011-223720

(51) Int. Cl.
| | | |
|---|---|---|
| B29C 49/00 | (2006.01) |
| B29C 45/17 | (2006.01) |
| H01M 2/02 | (2006.01) |
| H01M 10/0525 | (2010.01) |
| H01M 10/0585 | (2010.01) |
| B29K 105/00 | (2006.01) |
| B29C 45/40 | (2006.01) |
| B29C 45/43 | (2006.01) |

(52) U.S. Cl.
CPC ............ B29C 49/00 (2013.01); B29C 45/174 (2013.01); H01M 2/024 (2013.01); H01M 2/028 (2013.01);
(Continued)

(58) Field of Classification Search
CPC .......................... H01M 2/024; B29C 49/174
See application file for complete search history.

(56) References Cited

U.S. PATENT DOCUMENTS 5,344,596 A * 9/1994 Hendry ................. B29C 45/174
                                                    264/40.3
7,582,250 B2   9/2009 Uchida et al.
(Continued)

FOREIGN PATENT DOCUMENTS

CN         1964829 A      5/2007
EP         1 771 288 A1   11/2007
(Continued)

OTHER PUBLICATIONS

European Extended Search Report, Mar. 5, 2015, 10 pages.

*Primary Examiner* — Sarah A Slifka
*Assistant Examiner* — Brian Ohara
(74) *Attorney, Agent, or Firm* — Foley & Lardner LLP

(57) ABSTRACT

A compressed air is ejected from air ejector ports (14) to between a mold surface defining cavity (12) of mold (7) and a surface of a hot melt resin layer after starting to fill or inject the hot melt resin material into cavity (12) and before a temperature of the hot melt resin material becomes equal to or lower than a softening point thereof. Recesses (Q) are formed by positively generating a "sink mark" on a surface of edge protector (6) by ejection of the compressed air, and at the same time, gap (G) is formed between the surface of edge protector (6) and the mold surface. As a result, when bead-shaped edge protector (6) is integrally formed in long-side heat-fused portions (5c) of laminated-film exterior package case (5) by using a thermoplastic hot melt resin material, mold releasability of the molded edge protector from the mold can be enhanced.

4 Claims, 4 Drawing Sheets

(52) U.S. Cl.
CPC ......... *H01M 2/029* (2013.01); *H01M 2/0262* (2013.01); *H01M 10/0525* (2013.01); *H01M 10/0585* (2013.01); *B29C 45/40* (2013.01); *B29C 45/43* (2013.01); *B29C 2949/00* (2013.01); *B29K 2105/0067* (2013.01); *H01M 2200/20* (2013.01); *H01M 2220/20* (2013.01); *Y02P 70/54* (2015.11); *Y02T 10/7011* (2013.01)

(56) References Cited

U.S. PATENT DOCUMENTS

| | | | |
|---|---|---|---|
| 2007/0154799 A1* | 7/2007 | Yoon | H01M 2/1005 429/176 |
| 2007/0182066 A1* | 8/2007 | Uchida | B29C 45/174 264/328.1 |
| 2010/0252962 A1 | 10/2010 | Ueha et al. | |

FOREIGN PATENT DOCUMENTS

| | | | |
|---|---|---|---|
| JP | 04308712 | * | 10/1992 |
| JP | 6-79516 U | | 11/1994 |
| JP | 2002-260609 A | | 9/2002 |
| JP | 2003-117967 A | | 4/2003 |
| JP | 2004-122592 A | | 4/2004 |
| JP | 2006-100064 A | | 4/2006 |
| JP | 2006-114406 A | | 4/2006 |
| JP | 2007-128792 A | | 5/2007 |
| WO | WO 2005/120800 A1 | | 12/2005 |
| WO | WO 2006/038697 A1 | | 4/2006 |
| WO | WO 2007/037591 A1 | | 4/2007 |

* cited by examiner

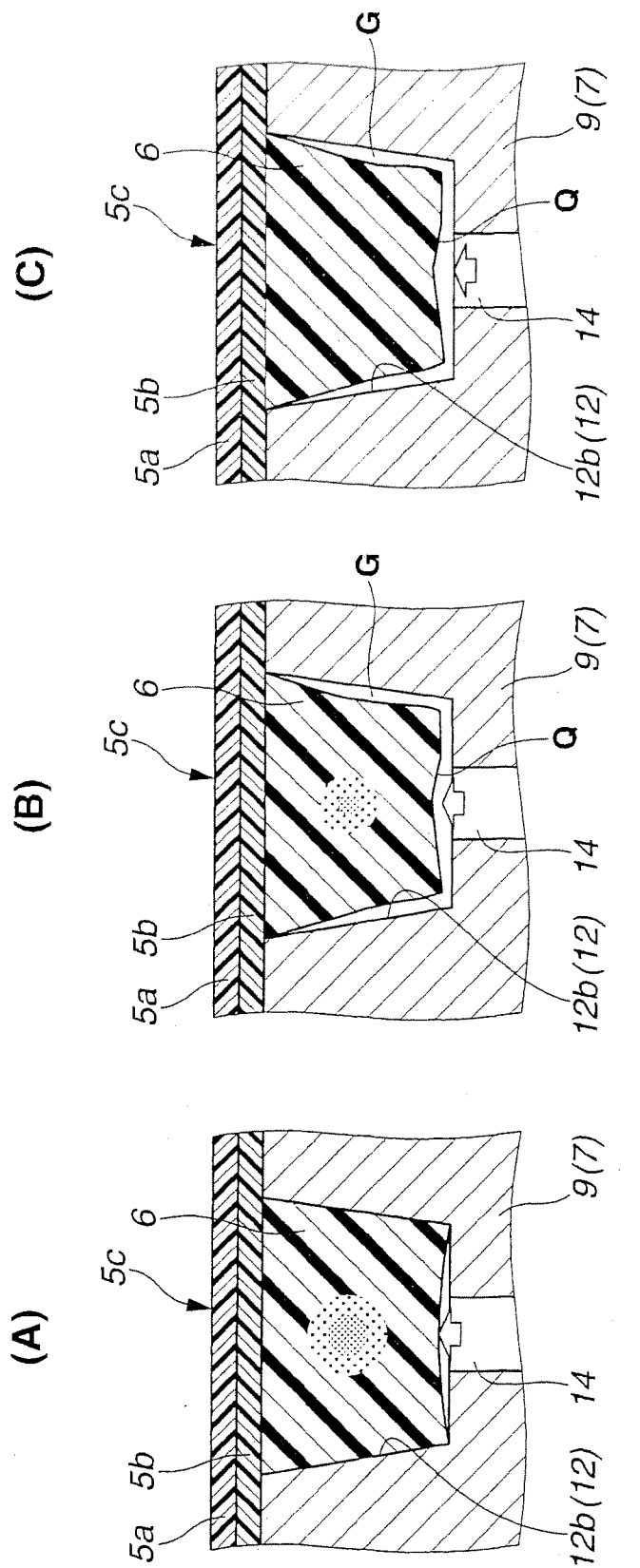

FABRICATION METHOD FOR LAMINATED-TYPE SECONDARY BATTERY

TECHNICAL FIELD

The present invention relates to a method for fabricating a laminate-type secondary battery (battery pack or packed battery), and more particularly relates to a method for integrally forming a bead-shaped edge protector on a peripheral edge portion of a laminated-film exterior package member accommodating cell elements by using a hot melt adhesive.

BACKGROUND ART

A structure of such a laminate-type secondary battery pack is known. For instance, Patent Literature 1 recites a laminate-type secondary battery in which cell elements including a positive electrode, a negative electrode and a separator are accommodated and sealed in a laminated-film exterior package member together with an electrolyte solution, and a frame member for reinforcement is formed by covering a periphery of the laminated-film exterior package member with a hot melt resin, preferably an ionomer resin in an airtightly sealed manner.

Upon fabricating the laminate-type secondary battery as described in Patent Literature 1, it is necessary to impart bonding properties to the hot melt resin used as a material for the frame member. However, some kind of the hot melt resin used tends to cause adhesion of a molded portion thereof to a mold, thereby extremely deteriorating a mold releasability of the molded portion from the mold. In addition, a rigidity of the laminated-film exterior package member itself which accommodates the cell elements is not high. Therefore, it is necessary to carefully release and take out (withdraw) the resulting molded article from the mold subsequent to opening the mold. As a result, when it is intended to mass-produce the laminate-type secondary battery, there is a limitation to reduction of a molding cycle time per one shot.

Further, if a release agent is used, the mold releasability of the molded portion from the mold can be improved to a certain extent. However, a work of applying the release agent to the mold will be additionally required to thereby limit reduction of the cycle time and inevitably cause increase in cost. Therefore, the use of the release agent is not necessarily desirable.

CITATION LIST

Patent Literature

Patent Literature 1: Japanese Patent Application Unexamined Publication No. 2007-128792

SUMMARY OF INVENTION

The present invention was made in view of the above problems. An object of the present invention is to provide a method for fabricating a laminate-type secondary battery remarkably improved in mold releasability of a bead-shaped edge protector from a mold upon integrally forming the bead-shaped edge protector on a peripheral portion of a laminated-film exterior package member by using a thermoplastic hot melt adhesive.

In one aspect of the present invention, there is provided a method for fabricating a laminate-type secondary battery, including:

setting a laminated-film exterior package member as an insert in a mold, the laminated-film exterior package member accommodating cell elements; and integrally forming a bead-shaped edge protector in a peripheral edge of the laminated-film exterior package member by molding a hot melt resin material such that the hot melt resin material surrounds an end edge of the laminated-film exterior package member and both opposite surfaces of the laminated-film exterior package member in a vicinity of the end edge, wherein a compressed air is introduced between a mold surface defining a cavity of the mold and a surface of a hot melt resin layer formed of the hot melt resin material after starting to fill or inject the hot melt resin material into the cavity and before a temperature of the hot melt resin material becomes equal to or lower than a softening point thereof.

According to the present invention, by introducing a compressed air between a mold surface defining the cavity and a surface of a hot melt resin layer after starting to fill or inject the hot melt resin material into the cavity and before the temperature of the hot melt resin material becomes equal to or lower than a softening point thereof, formation of a sink-mark like portion is facilitated in a portion of the edge protector except for a central portion of the edge protector which is located close to the mold surface, and at the same time, cooling in the portion located close to the mold surface is promoted. Therefore, a mold release resistance as well as a contact area between a surface of the formed edge protector and the mold surface can be reduced, so that the mold releasability can be enhanced to thereby shorten a cycle time upon mass-producing the laminate-type secondary battery. In addition, the use of a release agent can be omitted.

BRIEF DESCRIPTION OF DRAWINGS

FIG. 7 is a functionally explanatory diagram of air ejection in the mold structure shown in FIGS. 3 and 4.

DESCRIPTION OF EMBODIMENTS

Figure 1:
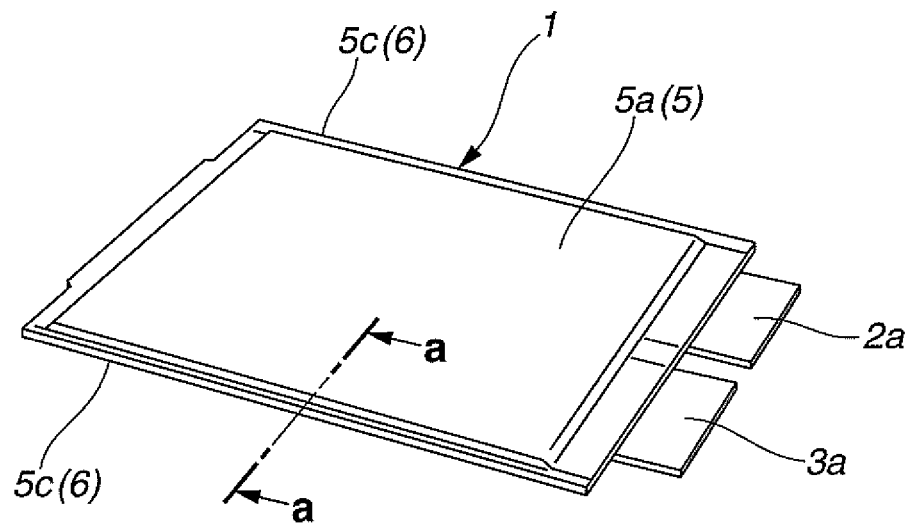
FIG. 1 is an explanatory diagram showing an appearance of a laminate-type lithium ion secondary battery to which the present invention is applicable.
Figure 2:
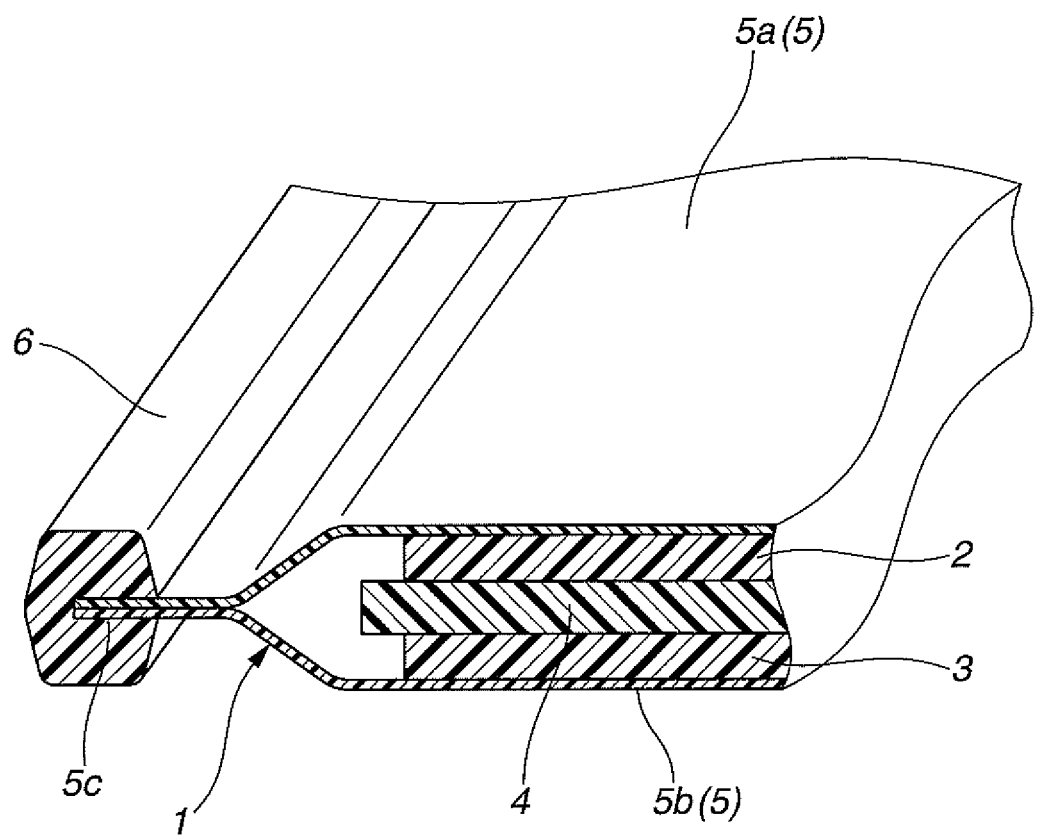
FIG. 2 is an enlarged sectional explanatory diagram taken along line a-a of FIG. 1.

The drawings following FIG. 1 show an embodiment according to the present invention. Particularly, FIG. 1 shows an appearance of a thin laminate-type lithium ion secondary battery (hereinafter simply referred to as "a battery") as one example of a laminate-type secondary battery to be fabricated, and FIG. 2 shows an enlarged sectional view taken along line a-a of FIG. 1. Meanwhile, the above-described battery is used as, for instance, a unit cell of a lithium ion battery for an electric vehicle.

As shown in FIGS. 1 and 2, battery 1 includes rectangular laminated-film exterior package case 5 as a laminated-film exterior package member which is constituted of two upper and lower laminated films 5a, 5b, and positive electrode terminal 2a and negative electrode terminal 3a which are packed in laminated-film exterior package case 5 so as to project to an outside. Positive electrode 2, negative electrode 3 and separator 4 are sealed in rectangular laminated-film exterior package case 5 together with an electrolyte solution. Laminated-film exterior package case 5 is airtightly sealed at four peripheral portions thereof by heat fusion.

For the sake of simple illustration, FIG. 2 shows only a set of a stacked body constituted of positive electrode 2, negative electrode 3 and separator 4. However, actually, a plurality of stacked bodies are stacked on one another and accommodated in laminated-film exterior package case 5. Each of upper and lower laminated films 5a, 5b forming laminated-film exterior package case 5 may have a composite structure in which an aluminum foil is covered with a heat-fusible resin film.

The four peripheral portions of laminated-film exterior package case 5 are held in a sufficiently airtightly sealed state by sealing these portions by heat fusion as described above. In addition, in order to further enhance airtight properties, a sealability and a rigidity at peripheral edges of laminated-film exterior package case 5, edge protectors 6 made of a thermoplastic hot melt resin material are molded and integrally formed particularly at long-side heat-fused portions 5c thereof, along a longitudinal direction of laminated-film exterior package case 5 for the purpose of reinforcement and protection of long-side heat-fused portions 5c. More specifically, bead-shaped edge protectors 6 each having a rectangular shape in sectional view and being made of a hot melt resin material are molded and integrally formed so as to surround end edges of long-side heat-fused portions 5c of laminated-film exterior package case 5 and both opposite surfaces (upper and lower surfaces) in the vicinity of the end edges of long-side heat-fused portions 5c.

Edge protectors 6 are molded as follows. After battery 1 is assembled by packing the above-described cell elements in laminated-film exterior package case 5, edge protectors 6 are molded in such a state that battery 1 including laminated-film exterior package case 5 is set as an insert in a mold.

The above-described thermoplastic hot melt resin material for edge protectors 6 is required to have sufficiently high bonding properties relative to laminated films 5a, 5b that form laminated-film exterior package case 5. Also, it is desirable that the thermoplastic hot melt resin material has water resistance, moisture resistance, dust-proof properties, electrical insulation properties, chemical resistance, etc. For this reason, in this embodiment, a polyamide-based or polyolefin-based thermoplastic hot melt resin material is used, and more specifically, a solvent-free one-component thermoplastic hot melt resin material, "Macromelt" (a registered trademark of Henkel, Inc.), is used.

Figure 3:
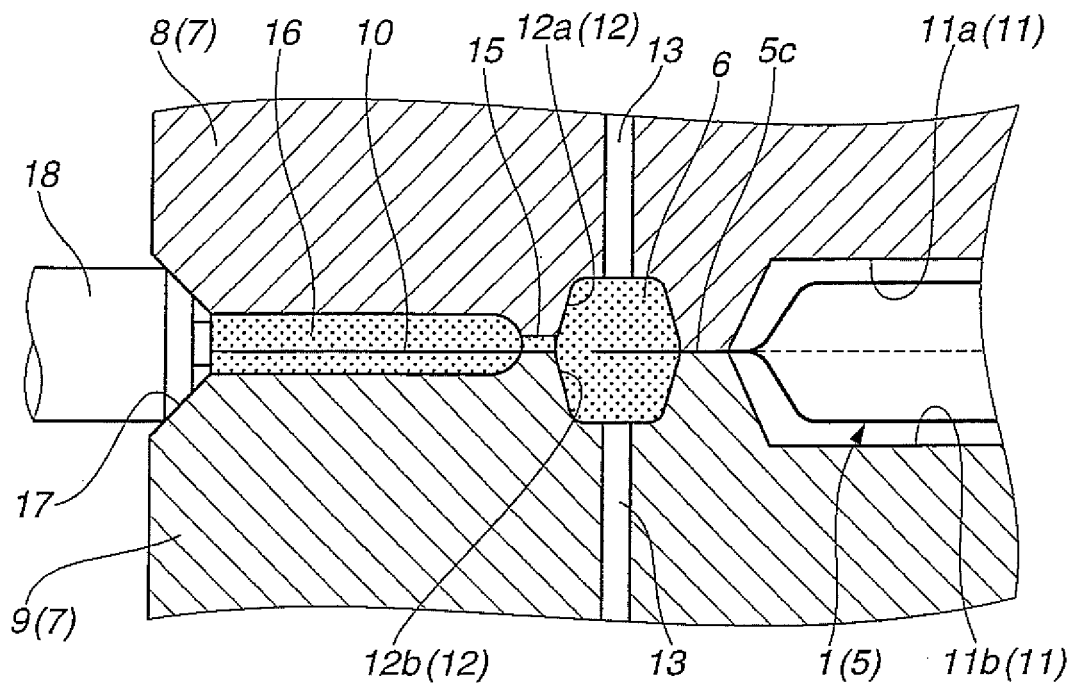
FIG. 3 is a sectional explanatory diagram of an essential part of a mold that serves to form an edge protector shown in FIG. 2.
Figure 4:
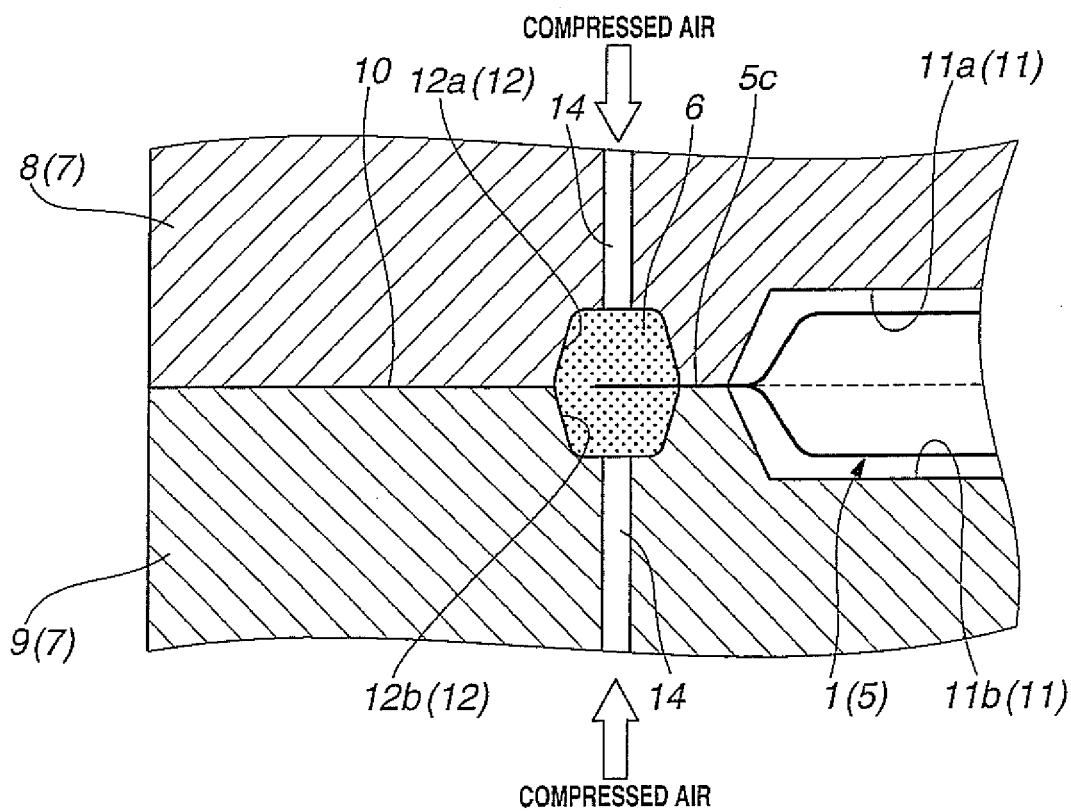
FIG. 4 is also a sectional explanatory diagram of the essential part of the mold that serves to form the edge protector shown in FIG. 2.

FIGS. 3 and 4 show a structure of an essential part of a mold structure to form edge protectors 6. Mold 7 has a split-half structure including upper mold 8 and lower mold 9 as two mold elements, in which lower mold 9 serves as a fixed mold and upper mold 8 serves as a moveable mold. Upper mold 8 and lower mold 9 have mating surfaces 10 through which upper mold 8 and lower mold 9 are mated with each other and clamped (closed) to each other. Formed in mating surfaces 10 are accommodating recesses 11a, 11b that cooperate with each other to define exterior package case accommodating portion 11 when upper mold 8 and lower mold 9 are clamped to each other. In addition, formed in mating surfaces 10 are molding recesses 12a, 12b that cooperate with each other to form a molded article-shaped space (cavity) 12 for edge protectors 6 when upper mold 8 and lower mold 9 are clamped to each other.

Figure 5:
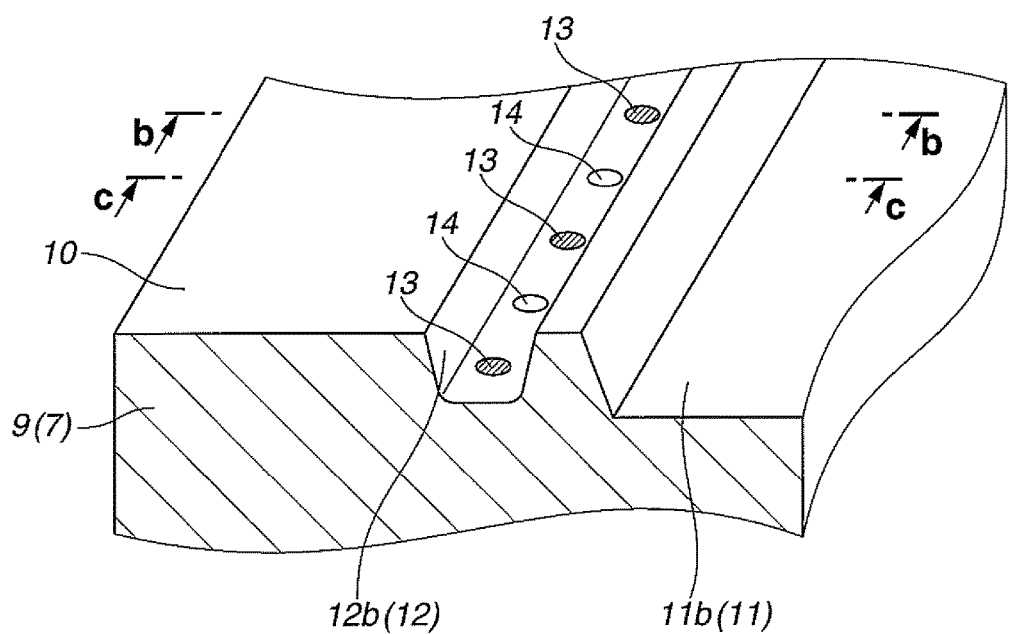
FIG. 5 is a perspective view of an essential part of only a lower mold shown in FIGS. 3 and 4.

As shown in FIG. 5, tip ends of a plurality of ejector pins 13 are exposed to an inside bottom surface of molding recess 12b on a side of lower mold 9. Ejector pins 13 are arranged spaced apart from each other at a predetermined pitch in a longitudinal direction of the inside bottom surface of molding recess 12b. Further, air ejector port 14 serving as a compressed air blowing hole is formed to open to the inside bottom surface of molding recess 12b between adjacent ejector pins 13 arranged with the predetermined pitch. That is, ejector pins 13 and air ejector ports 14 are alternately arranged on the inside bottom surface of molding recess 12b along the longitudinal direction thereof.

The mold structure shown in FIG. 5 is provided on a side of upper mold 8. FIG. 3 shows a cross section taken along line b-b of FIG. 5. Similarly, FIG. 4 shows a cross section taken along line c-c of FIG. 5.

Further, as shown in FIG. 3, runner portion 16 with sprue 17 is connected to cavity 12 formed by upper and lower molds 8, 9 in a clamped state thereof, through gate portion 15. A molten thermoplastic hot melt resin material is filled or injected from filling nozzle 18 abutted on sprue 17, so that the above-described edge protectors 6 are integrally formed.

Figure 6:
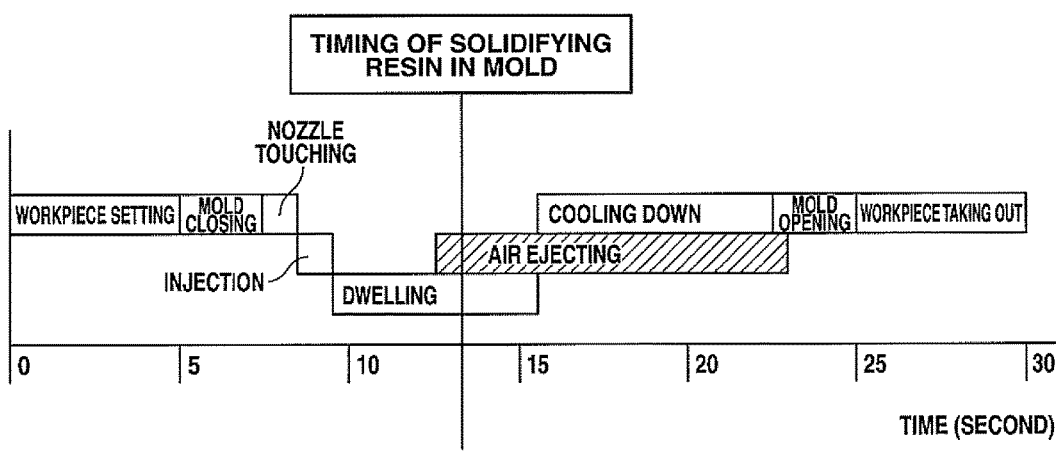
FIG. 6 is a time chart upon molding the edge protector using the mold structure shown in FIGS. 3 and 4.

FIG. 6 is a time chart upon molding edge protectors 6 with the mold structure shown in FIGS. 3 and 4. As shown in FIG. 6, a workpiece is set in lower mold 9 in an open state of mold 7, that is, battery 1 with laminated-film exterior package case 5 which serves as an insert is set in lower mold 9, and positioning of battery 1 is carried out. Then, mold clamping (mold closing) is carried out. By thus conducting the mold clamping, as shown in FIGS. 3 and 4, a root side of each long-side heat-fused portion 5c of laminated-film exterior package case 5 of battery 1 is pressed and restrained by upper and lower molds 8, 9 through mating surfaces 10, and at the same time, cavity 12 is defined by molding recesses 12a, 12b of upper and lower molds 8, 9.

Subsequently, a molten hot melt resin material is injected (filled) from filling nozzle 18 toward cavity 12 in such a state that filling nozzle 18 is contacted with sprue 17. Immediately after a predetermined amount of the hot melt resin material is injected, a shift to a dwelling step is carried out, and a step of simultaneously blowing and ejecting a compressed air from respective air ejector ports 14 of upper and lower molds 8, 9 is carried out in an overlapping relation to the dwelling step before the hot melt resin material is solidified or cured in the mold, in other words, before the temperature of the hot melt resin material becomes equal to or lower than a softening point thereof. Then, the hot melt resin material filled is allowed to stand until the hot melt resin material filled is cooled and solidified (cured), so that edge protector 6 is integrally formed on each long-side heat-fused portion 5c of laminated-film exterior package case 5 as shown in FIG. 2.

Meanwhile, the molding method using the specific thermoplastic hot melt resin material as described above is also called a hot melt molding that is one of low pressure injection molding methods. One of advantages of the molding method resides in that an injection pressure is extremely low as compared to that in the existing injection molding methods.

As shown in FIG. 6, the ejection of the compressed air is continued until a time at which upper and lower molds 8, 9 are opened. The air ejection step is carried out in parallel with a cooling step that is started simultaneously with completion of the dwelling step. The air ejection thus serves to promote the cooling that is conducted in the cooling step.

After that, upper and lower molds 8, 9 are opened before stopping air ejection from air ejector ports 14, and then battery 1 having integrally formed edge protector 6 is taken out from mold 7. At this time, as upper mold 8 is upwardly moved, ejector pins 13 on the side of upper mold 8 are projected out. Owing to this projecting movement of ejector pins 13 on the side of upper mold 8 and the blow of the compressed air from air ejector ports 14 on the side of upper mold 8, battery 1 including laminated-film exterior package case 5 with molded edge protector 6 is projected out from upper mold 8.

Further, ejector pins 13 on the side of lower mold 9 is projected out simultaneously with the projecting movement of ejector pins 13 on the side of upper mold 8 or with a slight delay therefrom. Owing to this projecting movement of ejector pins 13 on the side of lower mold 9 and the blow of the compressed air from air ejector ports 14 on the side of lower mold 9, battery 1 including laminated-film exterior package case 5 with molded edge protector 6 is projected out from lower mold 9, and then left on lower mold 9.

In the following, there is a discussion on a function attained by ejection of the compressed air which is carried out after the hot melt resin material is filled or injected into cavity 12 and before the hot melt resin material filled or injected is solidified or cured in the mold, in other words, before the temperature of the hot melt resin material becomes equal to or lower than a softening point thereof.

FIG. 7 shows in enlarged view a change of a shape of a cross section of the hot melt resin material (edge protector 6) after the hot melt resin material is filled or injected into cavity 12. In FIG. 7, only the side of lower mold 9 is shown, and the side of upper mold 8 is omitted. However, it is understood from FIGS. 3 and 4 that the side of upper mold 8 is in a symmetric relation to the side of lower mold 9.

As shown in (A) in FIG. 7, when the compressed air is ejected from air ejector ports 14 into cavity 12 after the hot melt resin material is filled or injected into cavity 12 and before the hot melt resin material filled or injected is solidified or cured in the mold, that is, before the temperature of the hot melt resin material becomes equal to or lower than a softening point thereof, solidification or curing of the hot melt resin material proceeds from a portion thereof contacted with a mold surface, but a central portion thereof still remains in a semi-molten state in which the hot melt resin material is non-solidified or non-cured. Therefore, the hot melt resin material as a whole is compressed while being pressed against long-side heat-fused portions 5c of laminated-film exterior package case 5. Simultaneously, the cooling effect is promoted by ejection of the compressed air, and as shown in (B) in FIG. 7, a "sink mark" is generated due to shrinkage that occurs in association with solidification or curing as the cooling solidification or cooling curing proceeds. Particularly, a recess Q is formed in a portion of the hot melt resin material on which the compressed air ejected from air ejector ports 14 is struck in a normal direction.

Specifically, owing to ejection of the compressed air into cavity 12 which is carried out after the hot melt resin material is filled or injected into cavity 12 and before the hot melt resin material filled or injected is solidified or cured in the mold, as shown in (B) in FIG. 7, the "sink mark" is positively generated in the hot melt resin material layer to form edge protector 6, so that a predetermined gap G is generated between the mold surface defining cavity 12 and the hot melt resin material layer to form edge protector 6.

Therefore, as shown in (C) in FIG. 7, when the hot melt resin material layer in cavity 12 is solidified or cured to form edge protector 6, the gap G remains between a surface of edge protector 6 and the mold surface defining cavity 12. This means that a contact area of edge protector 6 relative to the mold surface of cavity 12 and an adhesive force of edge protector 6 relative to the mold surface of cavity 12 are remarkably reduced before the mold opening is carried out.

Accordingly, as described above, when the mold edge protector 6 is projected by projecting ejector pins 13 of both molds 8,9 after opening upper and lower molds 8,9, a mold release resistance of the mold edge protector 6 relative to mold recesses 12a, 12b of both molds 8,9 becomes extremely small so that the mold edge protector 6 can be remarkably smoothly released and taken out from upper and lower molds 8,9. As a result, both mold releasability and moldability of edge protector 6 can be enhanced without using a release agent to thereby shorten a molding cycle time upon mass-producing battery 1.

Further, the compressed air is ejected in a same direction as the direction in which ejector pins 13 are projected. Therefore, an ejecting force of the compressed air acts to positively release the mold edge protector 6 while projecting the mold edge protector 6 from lower mold 9 in cooperation with the projecting force of ejector pins 13. As a result, the mold releasability can be enhanced.

Further, the direction in which the compressed air is ejected is aligned with a direction in which edge protector 6 formed of the hot melt resin material is pressed onto one surface or an opposite surface (the upper surface or the lower surface) of each of long-side heat-fused portions 5c of laminated-film exterior package member 5. Therefore, bonding properties of edge protector 6 relative to laminated-film exterior package member 5 can be significantly enhanced.

Incidentally, it would be considered that the positive generation of the "sink mark" in a portion of the molded article as described in the above-described embodiment means deterioration of accuracy in original shape of the molded article, particularly, in many cases, the "sink mark" may not be generated in the molded article from a viewpoint of design. However, edge protector 6 as described above does not strictly require a design characteristic owing to the function, and suffers no adverse influence of the "sink mark". More specifically, when single battery 1 as shown in FIG. 1 is used as one cell, a plurality of cells are collected to one unit, and then accommodated in a hard case made of a metal to thereby form a battery module. Accordingly, the shape accuracy of edge protector 6 itself does not pose a particular problem as long as edge protector 6 can perform a function of preventing battery 1 from metal touch with the hard case made of a metal.

The invention claimed is:

1. A method for fabricating a laminate-type secondary battery, comprising:
   setting a laminated-film exterior package member as an insert in a mold, the laminated-film exterior package member accommodating cell elements; and
   integrally forming a bead-shaped edge protector in a peripheral edge of the laminated-film exterior package member by molding a hot melt resin material such that the hot melt resin material surrounds an end edge of the laminated-film exterior package member and both opposite surfaces of the laminated-film exterior package member in a vicinity of the end edge,
   wherein a compressed air is introduced between a mold surface defining a cavity of the mold and a surface of a hot melt resin layer formed of the hot melt resin material after starting to fill or inject the hot melt resin material into the cavity and before a temperature of the hot melt resin material becomes equal to or lower than a softening point thereof, wherein introduction of the compressed air is carried out by blowing the compressed air in a same direction as a direction in which a plurality of ejector pins are projected from a part of the mold surface defining the cavity, and wherein the direction in which the compressed air is blown is aligned with a direction in which the edge protector formed of the hot melt resin material is pressed onto one of the opposite surfaces of the laminated-film exterior package member or another of the opposite surfaces thereof.

2. The method for fabricating a laminate-type secondary battery as claimed in claim 1, wherein the surface of the hot melt resin layer is a portion directly exposed to the compressed air introduced, and a gap is formed between the portion exposed and the mold surface defining the cavity.

3. The method for fabricating a laminate-type secondary battery as claimed in claim 1, wherein the plurality of ejector pins are arranged to be exposed to the mold surface defining the cavity and spaced apart from each other at a predetermined pitch in a longitudinal direction of the edge protector to be molded, and compressed air blowing holes are respectively formed to open to the mold surface between respective adjacent two of the ejector pins, and wherein the compressed air is simultaneously blown from the compressed air blowing holes.

4. The method for fabricating a laminate-type secondary battery as claimed in claim 3, wherein the mold has a split-half structure comprising two mold elements, the cavity being formed between mating surfaces through which the mold elements are mated with each other, wherein the plurality of ejector pins are arranged to be exposed to a mold surface defining a cavity of each of the mold elements and spaced apart from each other at a predetermined pitch in the longitudinal direction of the edge protector to be molded, and compressed air blowing holes are respectively formed to open to the mold surface between respective adjacent two of the ejector pins, and wherein the compressed air is simultaneously blown from the compressed air blowing holes.

* * * * *